(12) United States Patent
Turner

(10) Patent No.: US 12,546,968 B2
(45) Date of Patent: Feb. 10, 2026

(54) METHOD AND APPARATUS FOR DEPLOYMENT OF A TUBULAR BODY ONTO A SURFACE

(71) Applicant: TRAXYL, INC., Gainesville, VA (US)

(72) Inventor: Daniel R. Turner, Arlington, VA (US)

(73) Assignee: TRAXyL, Inc., Gainesville, VA (US)

( * ) Notice: Subject to any disclaimer, the term of this patent is extended or adjusted under 35 U.S.C. 154(b) by 617 days.

(21) Appl. No.: 18/004,426

(22) PCT Filed: Jun. 25, 2021

(86) PCT No.: PCT/US2021/039042
§ 371 (c)(1),
(2) Date: Jan. 5, 2023

(87) PCT Pub. No.: WO2022/010663
PCT Pub. Date: Jan. 13, 2022

(65) Prior Publication Data
US 2024/0026616 A1  Jan. 25, 2024

Related U.S. Application Data

(60) Provisional application No. 63/048,962, filed on Jul. 7, 2020.

(51) Int. Cl.
*G02B 6/44* (2006.01)
*E01C 23/09* (2006.01)
*E01C 23/14* (2006.01)

(52) U.S. Cl.
CPC ........ *G02B 6/4486* (2013.01); *E01C 23/0986* (2013.01); *E01C 23/14* (2013.01)

(58) Field of Classification Search
CPC ... E01C 23/0986; E01C 23/14; G02B 6/4486; H02G 1/06
See application file for complete search history.

(56) References Cited

U.S. PATENT DOCUMENTS 1,399,681 A    12/1921  Austin
1,467,243 A     9/1923  Fitzgerald
(Continued)

FOREIGN PATENT DOCUMENTS

CN    1311038     4/2007
DE    10163464    6/2003
(Continued)

OTHER PUBLICATIONS

International Preliminary Report on Patentability in International Appln. No. PCT/US2021/039042, mailed on Jan. 19, 2023, 7 pages.
(Continued)

*Primary Examiner* — Abigail A Risic
(74) *Attorney, Agent, or Firm* — Fish & Richardson P.C.

(57) ABSTRACT

A method and apparatus for deploying a tubular body onto a surface. The apparatus includes a main body movable in an advancing direction. The apparatus includes a deployment mechanism that deploys a tubular body directly onto a surface. The apparatus includes at least one container that stores an uncured protectant. The container is mounted on the main body. The apparatus may include a second container that stores a second protectant. The second protectant is different than the uncured protectant. The apparatus includes at least one curing device, which can cure the uncured protectant after the uncured protectant is applied to surface.

29 Claims, 10 Drawing Sheets

(56) References Cited

U.S. PATENT DOCUMENTS

| | | |
|---|---|---|
| 1,946,972 A | 2/1934 | Heltzel |
| 2,098,870 A | 11/1937 | Heltzel |
| 2,324,760 A | 7/1943 | Brulotte |
| 2,636,425 A | 4/1953 | Heltzel |
| 2,931,444 A | 4/1960 | Mills |
| 3,080,800 A | 3/1963 | Malzahn |
| 3,261,272 A | 7/1966 | Jennings, Jr. |
| 3,313,321 A | 4/1967 | Keller |
| 3,377,932 A | 4/1968 | Atkinson |
| 3,394,554 A | 7/1968 | Kinnan |
| 3,552,417 A | 1/1971 | Goff |
| 3,600,773 A | 8/1971 | Davis |
| 3,664,137 A | 5/1972 | Lett |
| 3,713,300 A | 1/1973 | Ward |
| 3,911,390 A | 10/1975 | Myers |
| 4,027,990 A | 6/1977 | Merrill |
| 4,084,928 A | 4/1978 | Petersik |
| 4,145,155 A | 3/1979 | Ogaki et al. |
| 4,175,885 A | 11/1979 | Jeppson |
| 4,310,293 A | 1/1982 | Eggleton |
| 4,437,789 A | 3/1984 | Kasiewicz |
| 4,507,012 A | 3/1985 | Corcoran et al. |
| 4,521,767 A | 6/1985 | Bridge |
| 4,566,823 A | 1/1986 | May |
| 4,630,965 A | 12/1986 | Nguyen et al. |
| 4,767,234 A | 8/1988 | Rizzo |
| 4,769,201 A | 9/1988 | Chiuminatta et al. |
| 4,789,266 A | 12/1988 | Clarke, Jr. et al. |
| 4,790,687 A | 12/1988 | Wright |
| 4,867,606 A | 9/1989 | Wright |
| 4,929,051 A | 5/1990 | Rogler et al. |
| 4,936,763 A | 6/1990 | Thomas |
| 4,984,932 A | 1/1991 | Leone |
| 5,009,546 A | 4/1991 | Domenighetti et al. |
| 5,018,955 A | 5/1991 | Parrish et al. |
| 5,260,520 A | 11/1993 | Muhs et al. |
| 5,366,023 A | 11/1994 | Souza |
| 5,484,224 A | 1/1996 | Lynch |
| 5,527,129 A | 6/1996 | McKinnon |
| 5,582,899 A | 12/1996 | Chiuminatta et al. |
| 5,879,109 A | 3/1999 | Finzel et al. |
| 5,934,831 A | 8/1999 | Mayr et al. |
| 6,189,244 B1 | 2/2001 | Johnson et al. |
| 6,236,798 B1 | 5/2001 | Finzel et al. |
| 6,293,728 B1 | 9/2001 | Eggleton et al. |
| 6,450,730 B1 | 9/2002 | Matthias et al. |
| 6,540,435 B1 | 4/2003 | Lizarraga |
| 6,622,574 B2 | 9/2003 | Fincke |
| 6,819,845 B2 | 11/2004 | Lee et al. |
| 6,863,470 B2 | 3/2005 | Eggleton et al. |
| 7,033,104 B2 | 4/2006 | Corcoran |
| 7,112,746 B2 | 9/2006 | Tsukahara et al. |
| 7,358,101 B2 | 4/2008 | Yang et al. |
| 7,614,827 B1 | 11/2009 | Makk |
| 7,768,032 B2 | 8/2010 | Makihara |
| 7,871,256 B2 | 1/2011 | Techlin et al. |
| 7,986,018 B2 | 7/2011 | Rennie |
| 8,080,901 B2 | 12/2011 | Doraisamy |
| 8,101,258 B2 | 1/2012 | Hahn |
| 8,262,998 B2 | 9/2012 | Vlahovic et al. |
| 8,668,405 B1 | 3/2014 | Singleton |
| 9,023,659 B2 | 5/2015 | Aimiya et al. |
| 9,316,343 B2 | 4/2016 | O'Hara |
| 9,537,292 B2 | 1/2017 | Gustavsso et al. |
| 9,588,315 B1 | 3/2017 | Turner |
| 9,880,369 B2 | 1/2018 | Elford et al. |
| 9,904,029 B1 | 2/2018 | Hendrickson et al. |
| 10,209,476 B2 | 2/2019 | Johnston et al. |
| 10,268,016 B1 | 4/2019 | Turner |
| 10,297,370 B1 | 5/2019 | Boecker et al. |
| 11,156,794 B2 | 10/2021 | Turner |
| 11,262,523 B2 | 3/2022 | Turner |
| 2002/0038716 A1 | 4/2002 | Pineda |
| 2003/0077125 A1 | 4/2003 | Ploeg |
| 2003/0113165 A1 | 6/2003 | Eggleton et al. |
| 2004/0144765 A1 | 7/2004 | Heindtel |
| 2005/0191133 A1 | 9/2005 | Purcell |
| 2007/0033840 A1 | 2/2007 | Schmidt |
| 2010/0299994 A1 | 12/2010 | Kneussle |
| 2010/0310312 A1 | 12/2010 | Mahler et al. |
| 2011/0018150 A1 | 1/2011 | Silver |
| 2011/0315259 A1 | 12/2011 | Kelly |
| 2012/0066987 A1 | 3/2012 | Malofsky et al. |
| 2014/0020815 A1 | 1/2014 | Dickinson et al. |
| 2014/0270971 A1 | 9/2014 | Allouche et al. |
| 2014/0294917 A1 | 10/2014 | Palchik et al. |
| 2015/0125218 A1 | 5/2015 | Gustavsson et al. |
| 2015/0129126 A1 | 5/2015 | Saito et al. |
| 2015/0310964 A1 | 10/2015 | Larson et al. |
| 2016/0130781 A1 | 5/2016 | Gustafsson et al. |
| 2018/0106015 A1 | 4/2018 | Pino et al. |
| 2019/0033550 A1 * | 1/2019 | Turner ............... E01C 23/0993 |
| 2019/0086002 A1 | 3/2019 | Pino et al. |
| 2020/0227904 A1 * | 7/2020 | Borer ......................... C09J 7/29 |
| 2021/0063668 A1 | 3/2021 | Turner |
| 2022/0155548 A1 | 5/2022 | Turner |
| 2024/0295713 A1 | 9/2024 | Turner |
| 2025/0044541 A1 | 2/2025 | Turner |
| 2025/0060554 A1 | 2/2025 | Turner |

FOREIGN PATENT DOCUMENTS

| | | |
|---|---|---|
| EP | 855772 A1 * | 7/1998 |
| FR | 2750717 | 1/1998 |
| FR | 2762155 | 10/1998 |
| JP | H07188583 | 7/1995 |
| JP | H07318741 | 12/1995 |
| JP | H09224313 | 8/1997 |
| JP | 2002131024 | 5/2002 |
| JP | 2003105706 | 4/2003 |
| WO | WO 1999035346 | 7/1999 |
| WO | WO 2009150305 | 12/2009 |
| WO | WO 2012112875 | 8/2012 |

OTHER PUBLICATIONS

Chuang et al., "Fiber Optical Sensors for High-Speed Rail Applications," Final Report for High-Speed Rail IDEA Project 19, innovations Deserving Explorator1 Analysis Programs, Aug. 2003, 40 pages.

Filikhin et al., "Electronic and level statistics properties of Si/SiO2 quantum dots," Physica E., May 2010, 42(7):1979-1983.

Guo et al., "Energy Transfer between colloidal semiconductor nanocrystals in an optical microcavity," Applied Physics Letters, Aug. 2006, 89(6):061104, 3 pages.

Merriam-Webster.com [online], "Pavement," Definition of "pavement" is a paved surface, retrieved on Dec. 21, 2023, retrieved from URL <https://www.merriam-webster.com/dictionary/pavements>, 10 pages.

Office Action in U.S. Appl. No. 16/287,642, dated Jan. 15, 2021, 18 pages.

Office Action in U.S. Appl. No. 17/491,784, dated Aug. 18, 2022, 10 pages.

Office Action in U.S. Appl. No. 17/491,784, dated Feb. 9, 2023, 11 pages.

Wikipedia.org [online], "Road Surface," retrieved on Dec. 21, 2023, retrieved from URL: <https://en.wikipedia.org/wiki/Road_surface>, 16 pages.

Extended European Search Report in European Application No. EP 21838712.4, dated Jul. 2, 2024, 9 pages.

International Search Report and Written Opinion issued in PCT/US2021/039042 dated Oct. 19, 2021.

* cited by examiner

METHOD AND APPARATUS FOR DEPLOYMENT OF A TUBULAR BODY ONTO A SURFACE

CROSS REFERENCE TO RELATED APPLICATIONS

This application is a U.S. national stage filing under 35 U.S.C. § 371 of International Application No. PCT/US2021/039042, filed Jun. 25, 2021, which claims priority benefit to U.S. Provisional Application Ser. No. 63/048,962 filed Jul. 7, 2020, the contents of which are incorporated by reference in their entireties.

TECHNICAL FIELD

The present disclosure relates to an apparatus and method for deploying a tubular body (or bodies) onto a surface. The tubular body may be a communication line, such as a fiber optic cable, and the surface may be a paved surface, such as a roadway.

BACKGROUND DISCUSSION

Communication lines or communication cables (i.e., examples of tubular bodies) provide useful conduits to transfer information (e.g., audio, visual, etc.) using modern technology. An example of a communication line is a fiber optic cable. The deployment and installation of communication lines, however, can be challenging for several reasons. For example, communication lines may need to extend over relatively long distances to, e.g., provide a telecommunications to a commercial or residential building. Additionally, the communication lines may need to be accessible (e.g., for maintenance or repairs). At the same time, however, the communication lines may need to be protected from the environment and are often preferred to be hidden from view.

The usual process for installing a communication cable over a relatively long distance often consists of extruding plastic core tubes around fibers, helically wrapping the tubes around a central strength member, building up several layers of protective sheathing, surrounding the sheathing with a protective material (armor) such as steel, and surrounding the armor with a heavy polymer jacket. Once a cable is manufactured, it can be pulled through conduits, hung along telephone poles, and/or buried inside trenches. Additional possibilities include what is known as "micro-trenching" (see e.g., International Patent Application Publication No. 09/935,346), where an extremely small trench is cut into the road surface or the ground. The cable is then installed within the micro-trench or installed on a roadway in the layers of protective sheathing as described above. Another example is described in U.S. Patent Application Publication No. 2002/0038716 where a flat fiber conduit is used for further protection.

The use of armor and other materials increases the weight, fabrication cost, and installation foot-print of the fiber cable. The larger installation footprint often requires the significant disruption and repair of the installed route, all of which contributes to higher installation cost.

When installing below the surface, fiber cables can either be directly buried or installed into a conduit to further protect the cable. As noted above, the cable and conduit are often installed by trenching into the ground. The use of the conduit requires the added cost and overhead of conduit installation along with the fiber cable manufacturing and installation. Additionally, cutting the micro-trench adds expense and time to the installation process.

The micro-trenching installation technique is mainly used on roadways and often utilizes a heavy duty diamond saw blade that cuts a narrow (e.g., only a few inches wide) section of a roadway or similar surface to a predetermined depth depending on the location. A communication cable is installed or micro duct is inserted for later filling with a communication cable. After that, the micro-trench is back-filled with an aggregate and another acceptable material. The risks of this technique (e.g., as described in International Patent Application Publication No. 09/935,346) include accidentally severing an existing utility line, damaging the integrity of the road surface, and risks to installers due to traffic and other safety concerns. Micro-trenching may not be preferred in certain surfaces, such as private roads, shallow road surfaces, bridges, and tunnels.

SUMMARY

An efficient, cost-effective tubular body deployment method and deployment apparatus remain desirable in view of the drawbacks associated with micro-trenching (some of which are discussed above).

U.S. Pat. No. 9,588,315 discloses a tubular body installation method that may help address some of the problems described above. This prior patent is hereby incorporated by reference. The tubular body installation method may involve applying a tubular body directly on to the surface. An uncured protectant may subsequently be applied on top of the tubular body that is on the surface and shaped to form a protective layer around the tubular body that is on the surface. When the protectant cures, the tubular body is adhered to the surface while being protectively encased in the cured protectant. This patent also discloses an apparatus that may be used to perform this tubular body installation method.

The apparatus and method disclosed in U.S. Pat. No. 9,588,315 may leave room for improvement in several areas. For example, increasing the advancing speed of the apparatus (and thus the speed of deploying the tubular body or communication line) could provide significant efficiency, cost, and time-saving advantages during cable laying. Additionally, the apparatus disclosed in U.S. Pat. No. 9,588,315 may require uncured protectant refilling at a rate that causes delays in the overall deployment time of the tubular body/communication line. For a final example, improvements may be possible for the strength, structural integrity, and/or surface adhesion of the cured protectant.

The tubular body deployment method and tubular body deployment apparatus disclosed here may provide some improvements, such as deployment efficiency, deployment advancing speed, structural integrity of the protectant covering a tubular body, and/or improvements in cost (of any of the components or of the deployment laying process as a whole). The particular arrangement of the components on the tubular body deployment apparatus may also provide a more compact, efficient arrangement that allows for longer continuous operation.

According to one aspect, an apparatus is disclosed for adhering a tubular body to a surface. The apparatus includes a main body movable in an advancing direction and a deployment mechanism configured to deploy a tubular body directly onto a surface. The apparatus includes a first protectant container configured to store a first protectant. The first protectant container is connected to the main body. The first protectant is uncured when stored in the first protectant container. The apparatus includes a first protectant conduit configured to apply the first protectant on the surface. The first protectant is applied on the surface behind where the tubular body is deployed onto the surface in the advancing direction so that the first protectant is deployed onto the tubular body and the surface. The apparatus includes at least one curing device positioned behind the first protectant conduit in the advancing direction. The at least one curing device is configured to cure the first protectant after the first protectant is applied on the tubular body on the surface to adhere the tubular body to the surface. The apparatus includes a second protectant container configured to store a second protectant. The second protectant is different than the first protectant. The second protectant container is connected to the main body. The apparatus includes a second protectant conduit configured to apply the second protectant onto the surface. The second protectant being applied behind the at least one curing device in the advancing direction so that the second protectant is deployed on top of the first protectant and the tubular body on the surface. The second protectant is configured to cure on the surface after being applied on top of the first protectant and the tubular body to further adhere the tubular body to the surface.

Another aspect involves an apparatus for adhering a tubular body to a surface that includes a main body movable in an advancing direction. The apparatus includes a deployment mechanism configured to deploy a tubular body directly onto a surface and a plurality of protectant containers configured to store a protectant or protectant components. The protectant containers are connected to the main body. The protectant is uncured when stored in the protectant containers. The protectant is curable. Means of curing include mixing protectant components together where one component is a catalyst that initiates an exothermic reaction that cures with another component into a protectant. Other means of curing could include exposing the uncured protectant with ultra-violet radiation that cures into a protectant. The apparatus includes a protectant conduit configured to apply the protectant on the surface. The protectant conduit is positioned to apply the protectant behind where the tubular body is deployed onto the surface in the advancing direction so that the protectant is deployed on top of the tubular body when the tubular body is on the surface. The apparatus includes a rotary carousel connected to the protectant containers. The rotary carousel is movable to collectively rotate the protectant containers relative to the main body.

Yet another aspect involves a method including applying a tubular body onto a surface; applying a first protectant onto the tubular body after the tubular body has been applied to the surface; shaping the first protectant after the first protectant has been applied to the tubular body on the surface; curing the first protectant after the first protectant has been applied to the tubular body on the surface; applying a second protectant on top of the first protectant and the tubular body after the first protectant has been applied to the surface; and curing the second protectant after the second protectant has been applied to the tubular body, such that the tubular body is adhered to the surface by the first and/or second protectants.

DETAILED DESCRIPTION

Figure 1:
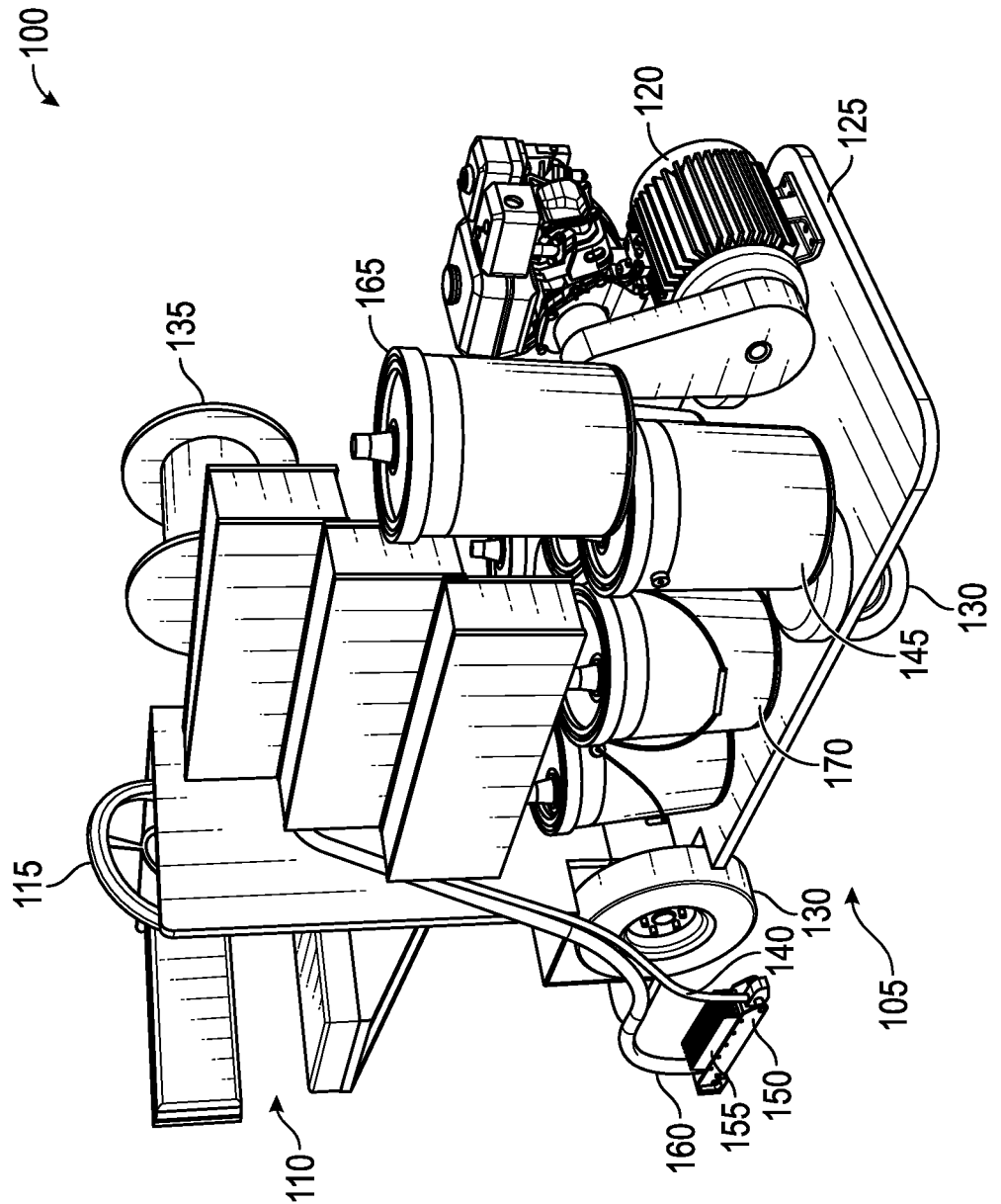
FIG. 1 is an isometric view of a tubular body deployment apparatus according to an embodiment.

Hereinafter, embodiments of a tubular body deployment method and an apparatus for deploying a tubular body representing examples of the inventive tubular body deployment method and apparatus disclosed here are described with reference to the accompanying drawing figures. The same reference numerals are given to common members in each drawing.

It is to be understood that the disclosure is not limited in any way to any particular construction, arrangement, materials, and/or composition of the components set forth in the following description.

FIG. 1 generally depicts an isometric view of one embodiment of a tubular body deployment apparatus 100 (which may be interchangeably called an "apparatus", "apparatus for tubular body deployment", etc., herein) representing an example of the tubular body deployment apparatus disclosed here.

As depicted in FIG. 1, the tubular body deployment apparatus 100 is for deploying a tubular body onto a surface 105. The tubular body may be a communication line or any type of electrical cable. For example, the tubular body may be a fiber optic cable. The surface 105 may be a man-made surface, such as a paved surface. For example, the surface may be a roadway, pathway, bridge, tunnel, golf cart path, structure (e.g., the side of a house), etc. In a preferred embodiment, however, the surface 105 is a paved surface such as a roadway.

The tubular body deployment apparatus 100 may include a driver area 110 with a steering wheel 115. The tubular body deployment apparatus 100 may be operated to move in an advancing direction, which would involve the driver looking forward and the apparatus 100 moving forward (i.e., the motor 120 is at the front or distal end of the tubular body deployment apparatus 100). The driver area 110 may include a foot pedal or any other conventional means of providing thrust to the apparatus 100. The steering wheel 115 may be used for steering, or any other known type of steering device (e.g., a joystick) may be provided. The apparatus 100 may be electrically powered. In general, the details of driving the apparatus 100 are not particularly limited and include any known types of propulsion, power arrangement, steering mechanisms, etc. The apparatus 100 may also omit the driving area 110 and instead be pushed forward manually.

As shown in FIG. 1, the tubular body deployment apparatus 100 includes a main body 125. The main body 125 provides the structural support of the tubular body deployment apparatus 100 to hold the other various components of the apparatus 100. The various containers, motors, conduits, mechanisms, etc. discussed herein may be directly mounted to the main body 125, detachably connected to the main body 125, housed within the main body 125, or may be indirectly mounted to the main body 125 (e.g., connected to another component that is directly mounted to the main body 125).

The main body 125 may include an exterior casing the enclose all of the various containers, motors, conduits, mechanisms, etc. of the apparatus 100. This exterior casing is not pictured so that the internal components may be seen for better understanding. The exterior casing may include one or more openable panels or doors to access a particular component. In one embodiment, there may specifically be an openable door or panel provided in the exterior casing to access one of the containers (described in more detail later) so that the container can be filled with protectant. A second openable door or panel may be provided in the exterior casing to access a container that stores a different protectant. The details of the protectant(s) and the containers are discussed below. The exterior casing may also include a door to access the driver area 110.

The main body 125 may include a chassis or any other known vehicle body to connect the main body 125 to wheels 130. In the embodiment of FIG. 1, there are four wheels 130, but the number of wheels 130 is not particularly limited. The apparatus 100 is also not limited to moving on wheels 130, as any means to advance the vehicle relative to the surface may be used. For example, the apparatus 100 may utilize a continuous track (e.g., like the tread of a tank), a low-friction base, maglev, etc.

In general, an important aspect of this application is the deployment of a tubular body onto the surface 105. The tubular body may be stored on a tubular body spool 130. The tubular body spool 130 is mounted, either directly or indirectly, to the main body 125 of the apparatus 100. The tubular body spool 130 is rotatable to act as a deployment mechanism to deploy the tubular body onto the surface 105. The location of deployment of the tubular body onto the surface 105 (i.e., the point where the tubular body first is applied to/contacts the surface 105) is ahead of (i.e., distal to) the deployment end of the first protectant conduit 140 in the advancing direction.

The tubular body itself that is deployed by the tubular body deployment apparatus 100 may be a communication line, such as a fiber optic cable. The tubular body may also be any type of elongated electrical structure, e.g., that may transmit electrical signals. The tubular body may be a hybrid optical and conductor cable containing multiple fibers and conductors inside. The conductor cables could be solid, stranded, or coaxial cables. The tubular body may also be an empty conduit or tube. The tube could transport liquids or gasses, or cables could be blown using high pressure air to pass the cable through the tube after it is installed onto a surface. The tubular body could also be an electrical structure representing an antenna that radiates an electro-magnetic wave to send a communication signal and an electromagnetic wave could be induced into the electrical structure to receive a communication signal.

The first protectant conduit 140 is connected, either directly or indirectly, to the first protectant container 145. The first protectant container 145 is a storage container such as a drum or bucket. The first protectant container 145 may include a lid, which may include a nozzle or other connection point for transferring the contents of the first protectant container 145 to the first protectant conduit. The first protectant stored in the first protectant container 145 may be an uncured flowable substance. For example, the first protectant may be an uncured liquid or semi-liquid UV resin. The first protectant may be transferred from the first protectant container 145 via the first protectant conduit 140 to the surface 100 during operation of the tubular body deployment apparatus 100. Since the deployment end of the first protectant conduit 140 is behind (proximal to) the deployment location of the tubular body, the first protectant can be applied on top of the tubular body while the tubular body is on the surface 105.

The tubular body deployment apparatus 100 may include at least one curing device 150. Additional details of the curing device 150 are discussed below.

As can be seen in FIG. 1, there may be a heat sink 155 attached to the curing device 150. The heat sink 155 is configured to remove heat during operation of the curing device 150. Although a passive plate heat sink is shown, the heat sink 155 is not particularly limited and may be an active (e.g., with a positive airflow or a fluid such as water) or passive heat sink and may be comprised of any combination of heat sink materials such as aluminum and/or copper. The heat sink 155 is shown as being affixed on top of the curing device 150 in FIG. 1, but the heat sink 155 is not limited to being provided in this particular location. In general, however, it is likely preferable that the heat sink 155 is provided on top of the curing device 150, to avoid interfering with the curing device 150 and to allow for maneuverability. The heat sink 155 may be flexible in some embodiments, e.g., by utilizing a plurality of sequentially connected smaller heat sinks 155 so that the heat sinks 155 may provide some flexibility in the lateral direction during deployment of the tubular body.

In the embodiment of FIG. 1, there is a second protectant conduit 160 with an open deployment end positioned immediately behind (proximal to) the curing device 150. The second protectant conduit 160 is connected, either directly or indirectly, to a hopper 165. As described in more detail below, the hopper 165 may be connected to one of the second protectant containers 170 to effectively serve as an intermediary to transfer the contents of one of the second protectant containers 170 to the second protectant conduit 160. In this manner, the hopper 165 may beneficially allow the continuous operation of the apparatus 100 (i.e., continuous forward movement and deployment of the tubular body and protectant(s)) even when one of the second protectant containers 170 runs out of second protectant and must be replaced. The second protectant containers 170 and operation of the second protectant containers 170 are discussed in more detail below.

Figure 2:
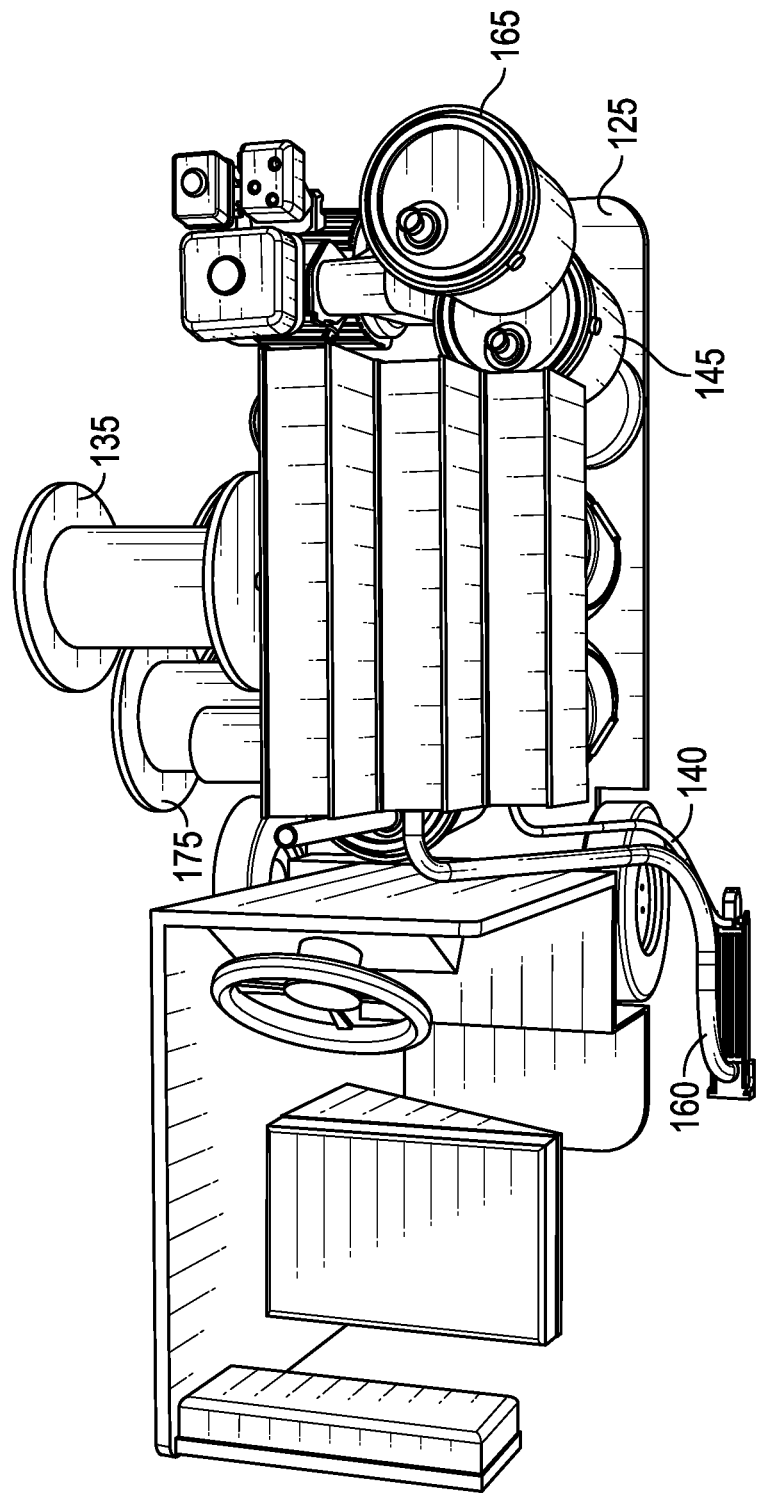
FIG. 2 is a top perspective view of the tubular body deployment apparatus shown in FIG. 1.

Turning to FIG. 2, there is a top perspective view of the apparatus 100 that shows the hopper 165 more clearly. As shown in both FIGS. 1 and 2, the hopper 165 may be elevated on the main body 125 above the first protectant container 145. The mounting details of the hopper 165 are not particularly important and so they are not shown in FIGS. 1 and 2 for clarity, but the hopper 165 may be placed on, and optionally fixed to, any type of supporting structure such as a simple stand. The hopper 165 may alternatively or additionally be connected to the inner surface of the exterior casing of the main body 125

The hopper 165 may be utilized to store a second protectant. For example, the second protectant may be an uncured flowable monomer or polymer. The second protectant is "flowable" meaning that the second protectant can be transferred (e.g., pumped) from the hopper 165 to the second protectant conduit 160 and ultimately to the surface 105. Therefore, the second protectant may be liquid or semi-liquid in the hopper 165. The hopper 165 may be directly or indirectly connected to the second protectant conduit 160 such that the second protectant conduit 160 communicates with the interior of the hopper 165.

As shown in FIGS. 1 and 2, the deployment end of the second protectant conduit 160 is positioned behind (proximal to) the deployment end of the first protectant conduit 140 and behind (proximal to) the curing device 150 in the advancing direction. Based on this configuration, the second protectant is applied on top of the first protectant after the first protectant has been applied on the tubular body on the surface 105 during use. In embodiments where the curing device 150 is provided as shown in FIGS. 1 and 2, the first protectant may be cured, partially or entirely, before the second protectant is deployed from the open deployment end of the second protectant conduit 160.

In some embodiments, the second protectant may be an uncured monomer, such as methyl methacrylate (MMA) that involves mixing components together, e.g., in a mixing nozzle, before applying the mixed components on the surface 105. For example, one component can be a flowable resin that activates (begins to cure) when mixed with another component that is a peroxide or hydroperoxide initiator to initiate the curing reaction. The two components could be activated/accelerated by a third compound, usually a tertiary amine. In other embodiments, the second protectant may be an uncured polymer epoxy resin that cures when a suitable hardener component is mixed with it. The second protectant may be curable by interaction with light and/or oxygen after the second protectant has been applied onto the surface 105. In other words, the curing process for the second protectant may involve an exothermic chemical reaction, or thermoset to cure on the surface 105. In this manner, the curing is the heat generated internally from a chemical reaction so that the second protectant is cured without the use of an external curing device. However, the second protectant is not limited in this manner, and a second external curing device may be provided proximal to the deployment end of the second protectant conduit 160 to cure the second protectant after it has been applied to the surface 105 during use.

In some embodiments, both the first and/or second protectants may include multiple components that are added into the uncured protective components. These materials are added to enhance or alter the properties of the cured protectant. One component could be an elastomer that alters the elasticity of the cured protectant. Generalized as composites, other components added into an uncured protectant could include fiberglass, aramid yarn, graphene, carbon fiber, glass chips, steel mesh, or another other filaments, mesh, or material that could be added into the uncured protectant to alter or enhance the material properties durability and strength when cured. Enhancements to the protective coating could include improvements to durability, elasticity, strength, impact or abrasion resistance, changes to color, conductivity, or any other desirable property to the cured protectant.

It should also be understood that details of the first protectant (e.g., including types of materials and types of curing) can be used for the second protectant, and similarly details of the second protectant can apply to the first protectant.

As can also be seen in FIG. 2, the apparatus 100 may include a second tubular body spool 175. The second tubular body spool 175 may be identical to the tubular body spool 135 or may be dimensioned differently. The second tubular body spool 175 may hold an identical tubular body as the tubular body spool 135 or may hold a different type of tubular body (e.g., different diameter cable or a different type of elongated communication line). In some embodiments, the second tubular body spool 175 may be omitted so that there is only one tubular body spool 135. The apparatus 100 is not limited to having two tubular body spools and could include any number as desired by one of ordinary skill in the art to deploy a desired numbers of tubular body lines.

Figure 3:
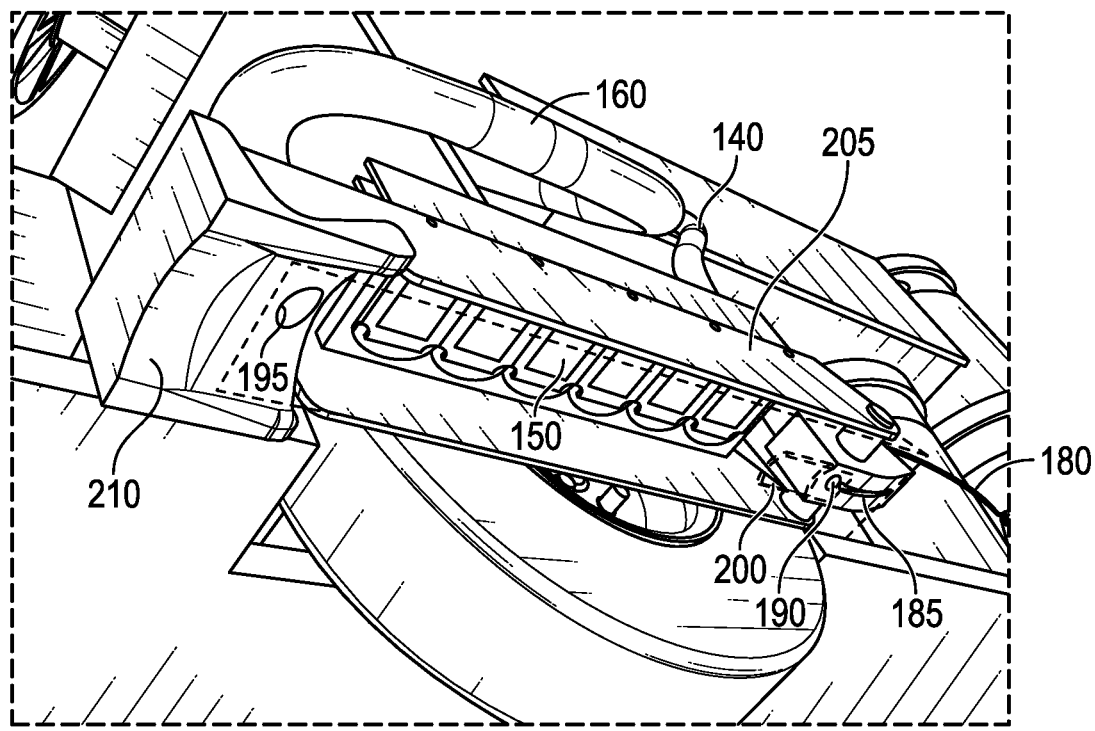
FIG. 3 is a perspective view looking upward from underneath the curing device, and tubular body and protectant deployment locations, of an embodiment of the tubular body deployment apparatus.

The tubular body spool 135 and/or the second tubular body spool 175 may deploy a tubular body 180 onto the surface 105 via a deployment groove 185 ahead of (distal to) the deployment end 190 of the first protectant conduit 140 as best seen in FIG. 3. FIG. 3 is a perspective view that is looks upward from underneath the curing device 150 and the deployment ends 190, 195 of the first and second protectant conduits 140, 160, respectively.

As shown in FIG. 3, the tubular body 180 is transferred to the lateral outer edge of the main body 125 and applied onto the surface 105 using the deployment groove 185. Two tubular bodies 180 may be applied onto the surface next to one another (optionally, intertwined or spiraled around one another) via the deployment groove 185 from the tubular body spool 130 and second tubular body spool 175, as discussed above. Alternatively, only one tubular body 180 may be deployed via the deployment groove 185 onto the surface 105. Any additional number of tubular body spools and tubular bodies may also be provided.

The deployment groove 185 may beneficially allow for the deployment of at least one tubular body 180 in a relatively smooth, linear manner. Although the apparatus 100 itself may turn and deploy the tubular body 180 in a manner with some overall curvature, the deployment groove 185 may help prevent any kinks or excessively sharp angles from arising during tubular body deployment. An elongated tubular body that helps to direct the tubular body 180 onto the surface 105 may be provided as discussed below and shown on FIG. 10. In some embodiments, a bare communication line guide may be used, such as that described in U.S. Pat. No. 9,588,315, the details of which are incorporated herein by reference.

The deployment groove 185 being positioned ahead of (i.e., distal to) the deployment end 190 of the first protectant conduit 140 allows for the first protectant to be applied on top of the tubular body 180 on the surface 105.

As shown in FIG. 3, the apparatus 100 may include a first shaping template 200. The first shaping template 200 may be configured to shape the first protectant after the first protectant is applied on the surface 105 (i.e., on top of the tubular body 180) and/or as the first protectant is being applied on the surface 105. The first shaping template 200 may have a semi-curved shape so that it defines an opening with a dome or semi-circle shape. The first shaping template 200 may contact the surface 105 in some embodiments, or the first shaping template 200 may be positioned slightly above the surface 105 so that the first shaping template 200 is close to, but not quite in contact with, the surface 105 during operation of the apparatus 100. The first protectant may pass through/under the first shaping template 200 so that the first protectant takes the cross-sectional shape as defined by the first shaping template 200 (e.g., a cross-sectional shape of a semi-circle, inverted parabola, bell-curve, etc.)

The first shaping template 200 may be transparent or partially transparent such that light emitted from the curing device 150 passes through the first shaping template 200 to begin curing the first protectant when the first protectant is underneath the first shaping template 200. The first shaping template 200 may be elongated such that it overlaps with at least a portion of the curing device 150 as shown in FIG. 3. In some embodiments, the first shaping template 200 may be extended to entirely overlap with the curing device 150. The first shaping template 200 may beneficially protect the first protectant from interacting with air (more specifically, the oxygen in air) while the first protectant is being cured under the curing device 150. When certain protectants are used, an affect known as oxygen inhibition can occur during curing if the protectant is exposed to oxygen, which results in a partially uncured resin residue on the surface of the first protectant. This uncured resin residue may decrease bonding strength/adhesion when subsequent (e.g., a second) protectant coatings are added.

The first shaping template 200 material is not particularly limited, and may be, for example, an acrylic, a cured resin polymer, a plastic, Teflon, or any other rigid material suitable for shaping the first protectant, while preventing oxygen inhibition from occurring and preventing cured resin from sticking to the first shaping template 200. In some embodiments, Teflon may be specifically used because a Teflon first shaping template 200 allows about 90% of UV light to pass there through and Teflon may be relatively favorable (compared to other materials) in avoiding sticking or adhering to the first protectant during curing.

In some embodiments, the first shaping template 200 may add texture to the resin by means of having protrusions or combs to add texture to the resin while its being cured. Adding texture may create a rougher surface that can enhance the bond strength to any protectant subsequently added on top of the first protectant.

Some of the details of an embodiment of the curing device 150 can also be better seen in FIG. 3. For example, the curing device 150 may be comprised of a sequential train of connected curing light bulbs/emitters. FIG. 3 shows an embodiment with six curing lights, but the number of curing lights is not particularly limited. A single, elongated curing light (e.g., a ultraviolet (UV) curing lamp) may also be used. The curing device 150 may have protective side panels 205 as shown in FIG. 3. The heat sink 155 is also partially visible in FIG. 3, as described in more detail above.

The curing device 150 may be of any type that is configured to provide a means for curing the first protectant. For example, the curing device 150 may apply UV light. In one embodiment, the curing device 150 may include a plurality of emitting diodes. For example, the curing device 150 may be a train of emitting diodes, such as 100 watt light emitting diode chips providing a range of wavelengths most useful for curing ultraviolet cured resin. The spectrum includes ultraviolet and visible light wavelengths and can range from 360 nanometers to 430 nanometer light. Other means of curing may include infra-red curing that thermally cures the protectants. These wavelengths generally fall between 700 nanometers and 1 millimeter for infra-red. Other potential curing devices could radiate microwave energy which have wavelengths of 1 millimeter to 1 meter.

In general, the curing device 150 is not particularly limited and can involve any means of curing a protectant, such as using one or more curing lights as described above. However, the curing device 150 may also include other means of curing, such as utilizing other wavelengths of light, microwave energy, thermal radiation, electric arcing, among others. Therefore, the curing device 150 may include microwave, thermal, and/or radiative emitters.

Figure 4:
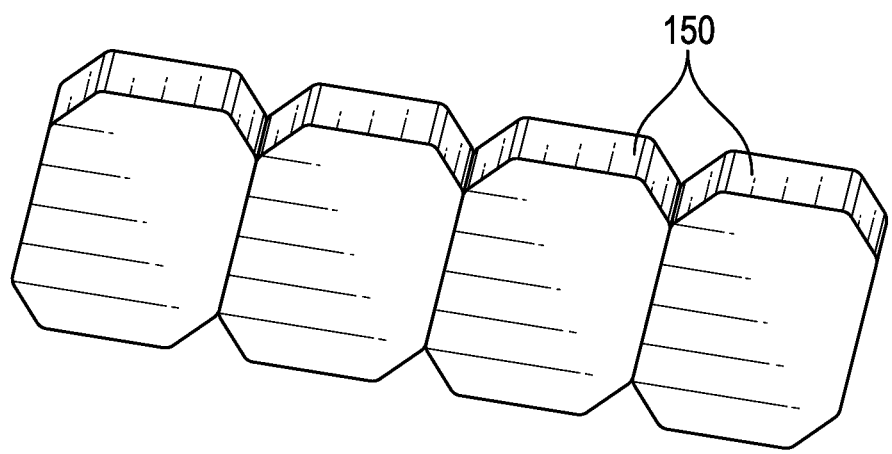
FIG. 4 is an example of another embodiment of the curing device.

Another embodiment of the curing device 150 is shown in FIG. 4. In FIG. 3, the curing device 150 is a sequential train of lights that are rigidly housed between the side panels 205. Therefore, the curing lights turn together in a relatively rigid manner when the apparatus 100 turns. The embodiment shown in FIG. 4, however, shows a curing device 150 that allows for lateral movement between adjacent curing lights. For example, the curing lights may be connected in sequence to form a train with a centipede structure, such that each curing light can move in the lateral direction (perpendicular to the advancing direction) relative to its adjacently connected curing lights 150. Although this discussion, and that above regarding FIG. 3, may be in the context of curing lights, the same configurations and designs could be used for the other types of curing means discussed herein, such as thermal energy emitters.

Other connections between adjacent lights or emitters of the curing device 150 are possible. For example, a plurality of curing lights or emitters can be mounted on a ball hitch. As mentioned above, in any of these embodiments, the heat sink 155 may be appropriately tailored to provide the same transverse movement freedom as the curing device 150.

Turning back to FIG. 3, some embodiments may include a second shaping template 210 provided behind (proximal to) the deployment end 195 of the second protectant conduit 160. Similar to the first shaping template 200 discussed above, the second shaping template 210 create an opening with the surface 105 (either by contacting the surface 105 or by being close to the surface 105). The second shaping template 210 may have a semi-curved shape so that it defines an opening with a dome or semi-circle shape. The second shaping template 210 may contact the surface 105 in some embodiments, or the second shaping template 210 may be positioned slightly above the surface 105 so that the second shaping template 210 is close to, but not quite in contact with, the surface 105 during operation of the apparatus 100. The second protectant may pass through/under the shaping template 210 so that the second protectant takes the cross-sectional shape as defined by the second shaping template 210 (e.g., a cross-sectional shape of a semi-circle, inverted parabola, bell-curve, etc.)

The second shaping template 210 may be opaque (non-transparent) and may be made of a different material than the first shaping template 200. In some embodiments, the two shaping templates 200, 210 may be made from the same material. In the embodiment shown in FIG. 3, the second shaping template 210 may be formed into a structural member at the end of the curing device 150 that also includes the deployment end 195 of the second protectant conduit 160. The second shaping template 210 may be metal, such as aluminum or a steel alloy, but is not limited to any particular material. The template may be shaped to texturize the resin (as described above) so as to increase the surface roughness, remove smoothness, add friction, and/or change the reflectivity of the protectant when cured.

Another beneficial arrangement that is apparent from FIG. 3 is the construction of the housing supporting the curing device 150, the deployment groove 185, and the deployment ends 190, 195 of the first and second protectant conduits

140, 160. As shown in FIG. 3, the leading edge of the housing (immediately distal to the proximal end of the deployment groove 185 and including a portion of the deployment groove 185 shown in FIG. 3) has an upward inclined surface. There is also a hinged connection that can be seen in FIG. 3, which allows the structural member with the deployment groove 185 to flexibly move along the surface 105. The upward inclined surface helps to prevent the entire deployment train (including the curing device 150, and the first and second protectant deployment points) from being caught or hindered by a surface irregularity.

In addition, there is a hinged connection at the proximal end of this deployment train between the side panels 205 of supporting the curing device 150 and the structural member that includes the second shaping template 210. This hinged connection provides for additional flexibility for the deployment train so that several of the components can rotate relative to one another to help ensure that the components continue to move along the surface 105.

Some methods of using the tubular body deployment apparatus 100 and/or deploying a tubular body may be apparent to one of ordinary skill in the art based on the descriptions above. Nonetheless, one example of a method for deploying a tubular body is now discussed in reference to FIG. 5, which shows a side view of the apparatus 100. The advancing direction is towards the right-hand side of FIG. 5, such that the apparatus 100 would be advancing from left to right in FIG. 5 to deploy the tubular body 180 on the surface 105.

As discussed above, the tubular body 180 may first be deployed onto the surface 105 through the deployment groove 185 distal to the deployment end 190 of the first protectant conduit 140. The tubular body spool 135 and/or the second tubular body spool 175 may be operated, automatically or manually, to deploy the tubular body (or multiple tubular bodies) 180 as the apparatus 100 moves forward in the advancing direction. In some embodiments, a system of spools and pulleys may be utilized to feed the tubular body 180 to the deployment groove 185. Additionally, one or more tension sensors may be provided to help control automatic feeding of the tubular body 180. For example, several tension sensors can be placed along the tubular body 180 feeding path between the tubular body spool 135 and the deployment groove 185 to automatically adjust the feeing speed of the tubular body spool 135 (e.g., when a tension sensor detects that the tubular body feeding tension drops below a certain level, a signal is sent so that the tubular body spool 135 is operated a bit more slowly to increase tension in the feed line). The tubular body 180 feeding system may be entirely automated such that the feeding of the tubular body 180 is controlled based on the forward speed of the apparatus 100 and/or adjusted based on inputs from the tension sensors so that the tubular body 180 is deployed in a continuous and consistent manner during forward advancement of the apparatus 100.

The first protectant, such as a UV curable flowable resin, may then be applied on top of the tubular body 180 from the deployment end 190 of the first protectant conduit 140 when the tubular body 180 is on the surface 105 (or simultaneously to the tubular body 180 being placed on the surface 105) as the apparatus 100 moves forward in the advancing direction. The first protectant may thus fully cover the tubular body 180 and also contact the surface 105 around the lateral edges of the tubular body 180. In some embodiments, the first protectant may pass through/under the first shaping template 200 after the first protectant is applied to the surface 105 or as the first protectant is being applied to the surface 105.

The apparatus 100 may continue moving forward in the advancing direction so that the curing device 150 begin to cure the first protectant on the tubular body and the surface 105 (i.e., to at least partially begin to adhere the tubular body to the surface and/or protectively encase the tubular body on the surface 105). A curing device 150, such as a train of curing lights may be provided so that the curing lights continue to cure the first protectant for a desired (i.e., predetermined) length of time based on the advancing speed of the apparatus 100.

The second protectant may thereafter be applied on top of the first protectant and the tubular body 180 on the surface from the deployment end of the second protectant conduit 160. The first protectant may be partially or fully cured by the time the second protectant is applied on top of the first protectant. The second protectant may thereafter cure by exposure to light and/or a catalyst such that the second protectant helps to further adhere the tubular body 180 to the surface 105. The second protectant may completely surround the tubular body 180 to protectively encase the tubular body 180 on the surface, or the second protectant may partially surround the tubular body 180 to protectively encase at least a portion of the tubular body 180 on the surface (e.g., the tubular body may include a reinforced structure that does not require full protective encasement).

Therefore, the result of this process is a tubular body 180 adhered to the surface 105 by the cured first protectant and cured second protectant. In some embodiments, the first and/or second protectants may protectively encase (entirely or partially) the tubular body 180 on the surface 105 after being cured. Or a combination may be used, e.g., the first protectant may adhere the tubular body 180 to the surface 105 and the second protectant may protectively encase the tubular body 180 on the surface 105. However, in some embodiments, the first or second protectant may be omitted such that only one protectant is used to adhere, and optionally protectively encase, the tubular body 180 on the surface 105.

Figure 6:
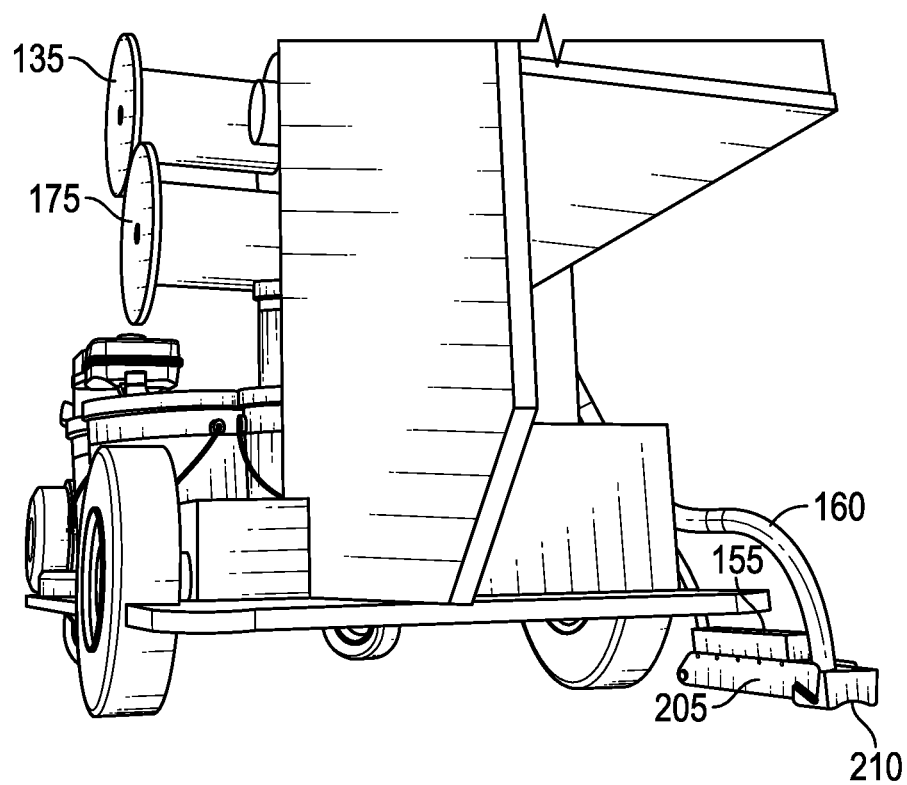
FIG. 6 shows a perspective view of the tubular body deployment apparatus looking forward (distally) in the advancing direction from a position behind (proximal to) the tubular body deployment apparatus.

FIG. 6 shows a perspective view of the tubular body deployment apparatus 100 looking forward in the advancing direction from a position behind the apparatus 100. As can be seen in FIG. 6, the second shaping template 210 is formed in part of a metal housing component that also connects to the deployment end 195 of the second protectant conduit 160.

FIG. 6 also shows the side panel 205 for the curing device 150 from a different perspective. The two side panels 205 may beneficially prevent light from the curing device 150 from dispersing laterally from the curing device 150 to help direct the curing light or curing emission directly onto the first protectant after the first protectant has been applied on top of the tubular body 180 on the surface 105. The tubular body spool 135 and the second tubular body spool 175 can also be seen from a different viewpoint in FIG. 6.

Figure 7:
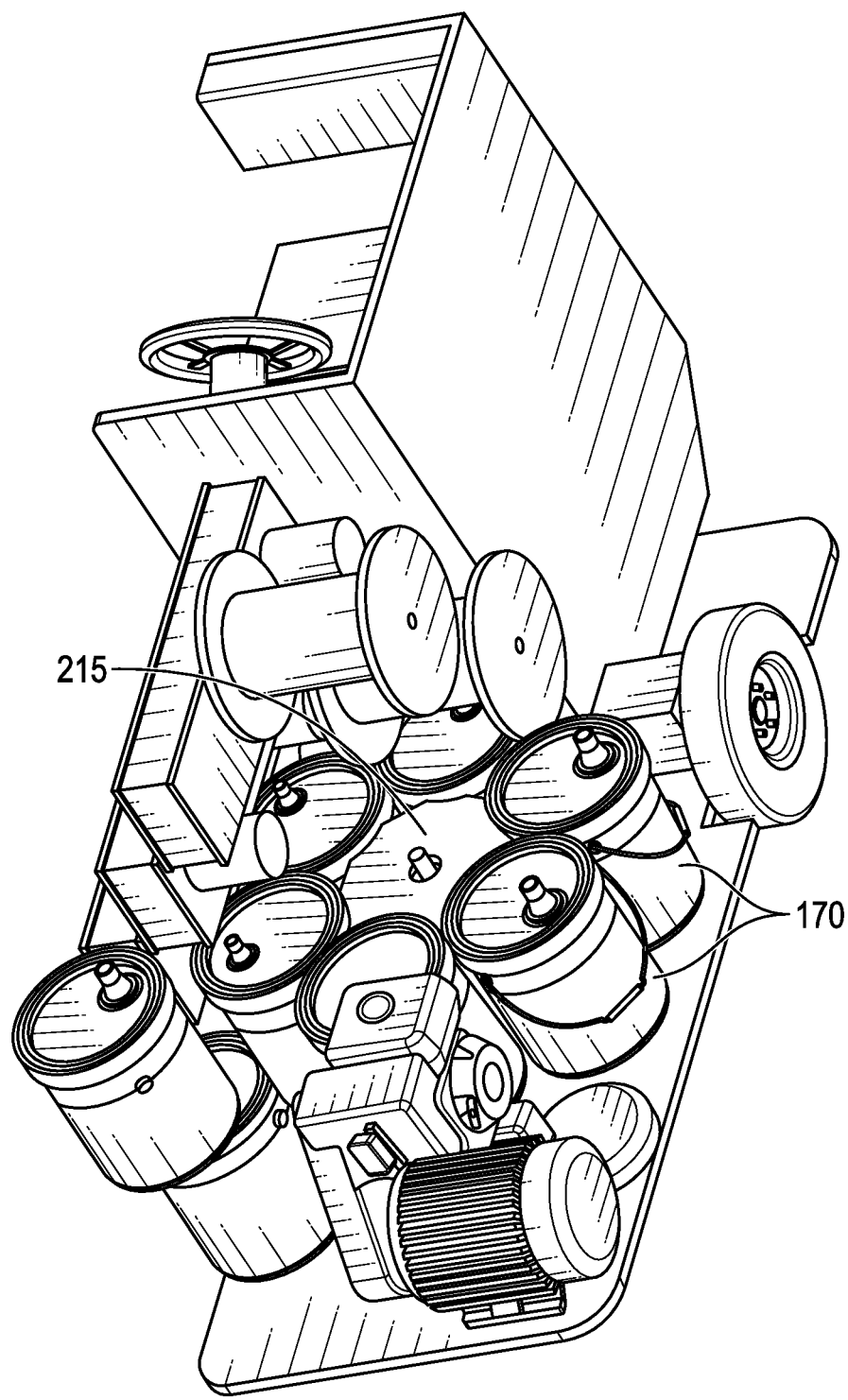
FIG. 7 is a perspective view showing a tubular body deployment apparatus according to an embodiment of the present application.

FIG. 7 shows a perspective view of the tubular body deployment apparatus 100 from a position in front of (distal to) the apparatus 100, from a viewpoint looking rearward (proximal) and downward at the apparatus 100. FIG. 7 shows that the apparatus 100 of the present embodiment includes six second protectant containers 170 that are connected to a carousel 215. The carousel 215 is operable to rotate the second protectant containers 170 to change the position of each of the second protectant containers 170. In other words, the carousel 215 is operable to collectively rotate all six of the second protectant containers 170 relative to the main body 125 of the apparatus 105 about a central axis.

Figure 8:
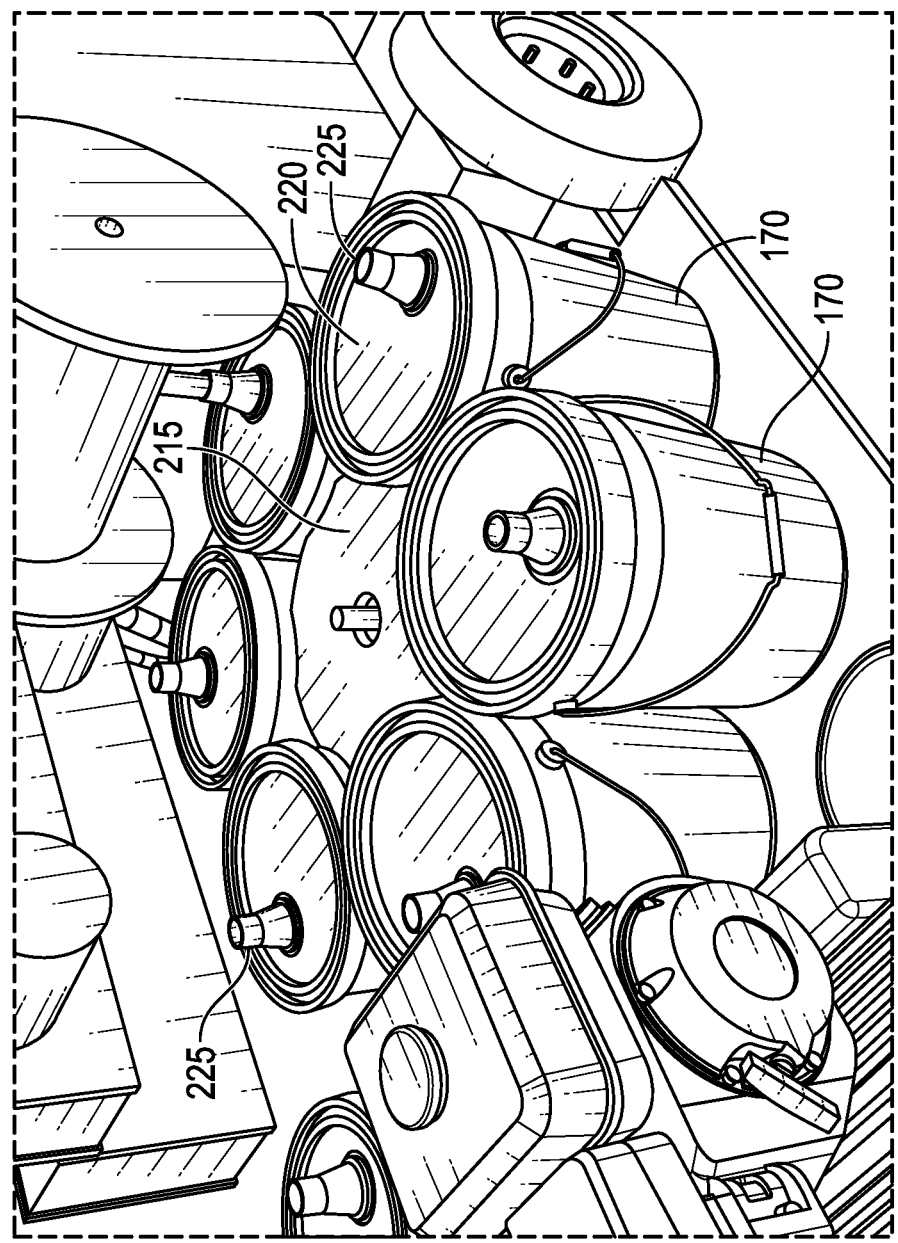
FIG. 8 is an enlarged perspective view showing the second protectant containers connected to the carousel according to an embodiment of the present application.

FIG. 8 shows an enlarged view of the six second protectant containers 170 connected to the carousel 215.

As shown in FIG. 8, in some embodiments, each of the second protectant containers 170 can be cylindrical drums or buckets. For example, each of the second protectant containers 170 may be a five gallon bucket. The size is not limited, however, and a person of ordinary skill in the art will recognize that many different sizes of containers may be used.

The second protectant containers 170 can be the same size or different sizes as one another, and the second protectant containers 170 can similarly be identical to or differently sized than the hopper 165 and/or first protectant container 145. In the embodiment shown in FIG. 7, the first protectant container 145, the hopper 165, and the second protectant containers 170 are all the same size, which provides efficiency in manufacturing and repair (e.g., container replacement). Additionally, some embodiments may only include a single second protectant container 170 (and thus the carousel 215 would not be necessary).

FIG. 8 shows that each of the second protectant containers 170 includes a container lid 220. The container lid 220 seals the container 170 so that the contents (e.g., second protectant) do not spill from the container 170. The container lid 220 may also help protect the contents of the second protectant containers 170 from interacting with the air (including oxygen in the air) which is desirable for some protectants.

FIG. 8 also shows that some embodiments of the apparatus 100 may include container nozzles 225 provided in the container lids 220. The container nozzles 225 may extend upward from the container lid 220. In other embodiments, the container nozzles 225 may be internal to the container lid 220 or may simply be an opening in the container lid 220. In some embodiments, the container nozzles 225 are sealed before use of the second protectant container 170 such that the contents of the second protectant container 170 are protected from interacting with the outside environment and/or spilling.

The hopper 165 and the first protectant container 145 may also include similar container lids 220 and container nozzles 225 as described regarding the second protectant containers 170.

As shown in FIGS. 7 and 8, the carousel 215 is connected to each of the second protectant containers 170. The carousel 215 may be automatic, semi-automatic, or manually operated. The carousel 215 is operable to rotate all of the second protectant containers 170 so that the second protectant containers 170 can move amongst different positions relative to the center axis of the carousel 215. Notably, there may be one position in which one of the second protectant containers 170 is operable to supply second protectant to the second protectant conduit 160. This position is best seen in FIG. 9.

Figure 9:
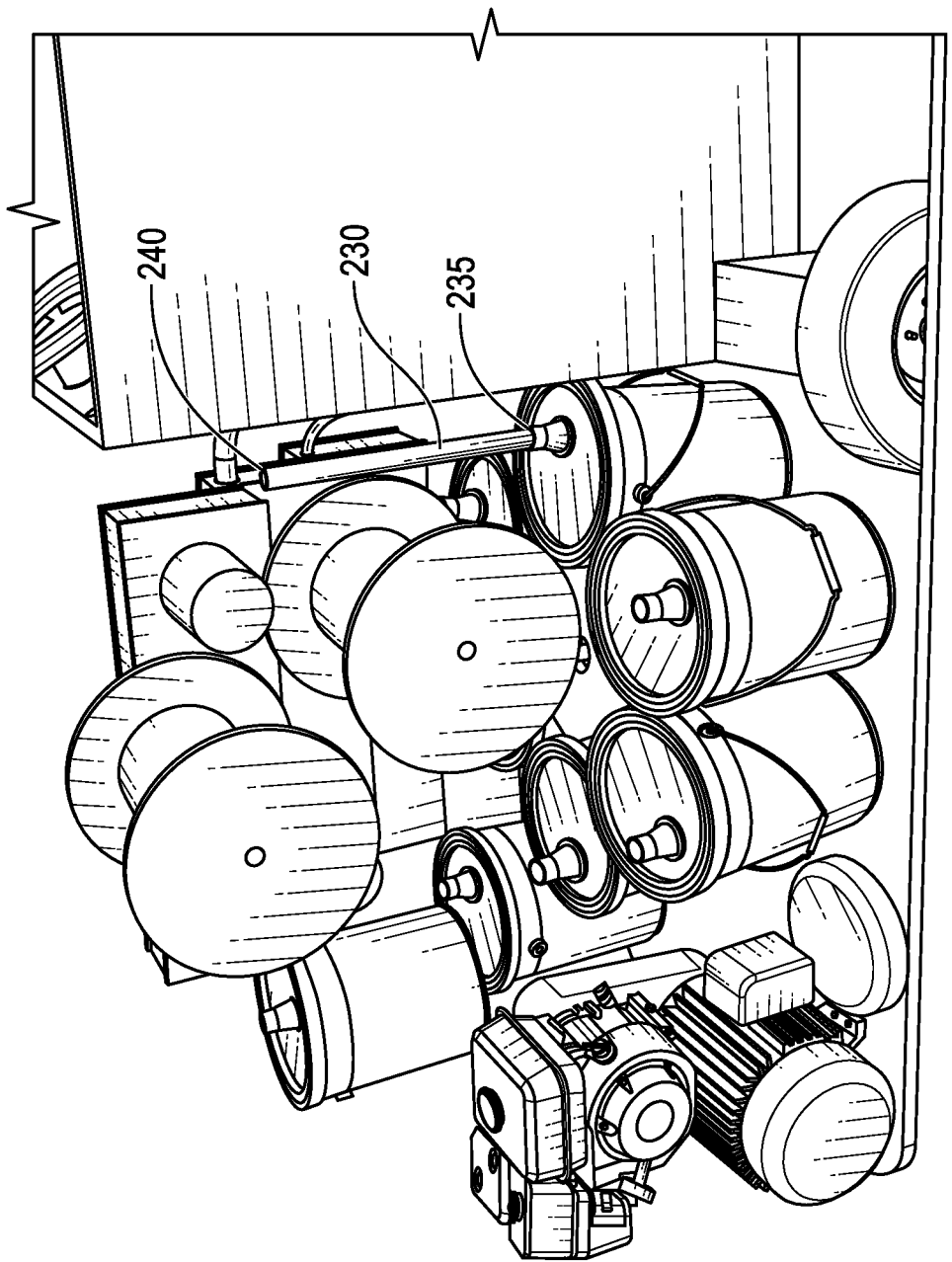
FIG. 9 is a perspective view showing a tubular body deployment apparatus according to an embodiment of the present application.

As can be seen in FIG. 9, the apparatus 100 may include a second protectant transfer conduit 230. The second protectant transfer conduit 230 may be vertically positioned above one of the second protectant containers 170.

The second protectant transfer conduit 230 may include a vertically lower end 235 and a vertically higher end 240 opposite the vertically lower end 235. Both the vertically lower and higher ends 235, 240 are open ends. The vertically lower end 235 may be tapered or sharpened such that it comprises a point or plurality of points that can puncture a seal. The vertically lower end 235 may include a puncturing component such as a spike. The second protectant transfer conduit 230 may be movable relative to the main body 125 and relative to the second protectant containers 170 in the vertical direction. To be more specific, the second protectant transfer conduit 230 may to puncture the seal on a container nozzle 235 with the tapered or sharpened vertically lower end 235 so that the transfer conduit 230 communicates directly with an interior of the second protectant container 170 that has the punctured seal.

In this manner, the second protectant container 170 that has rotated to being directly under the second protectant transfer conduit 230 is the second protectant container 170 out of the plurality of second protectant containers 170 that can communicate with the second protectant conduit 160 (e.g., via the hopper 165). In other words, the rotation of the carousel 215 to place one of the second protectant containers 170 at the second protectant transfer conduit 230 allows for the contents of that particular second protectant container 170 to be applied to the surface 105.

The second protectant transfer conduit 230 may be directly or indirectly connected to the second protectant conduit 160 to allow for the second protectant to be deployed on the surface 105. It is generally preferred that the second protectant transfer conduit 230 is connected to the second protectant conduit 160 at least via the hopper 165, for the reasons described herein, but the arrangement is not limited thereto. The details of the connection between the second protectant transfer conduit 230 and the second protectant conduit 160 is not limited, so long as the second protectant can be transferred from the second protectant container 170 via the second protectant transfer conduit 230 to the second protectant conduit 160 and to the surface 105 (e.g., there may be intermediary tubing/conduits that connect these different components to create a fluid flow path, e.g., optionally including the hopper 165). In another embodiment, the second protectant transfer conduit 230 and the second protectant conduit 170 can be one continuous structure with at least one flexible portion so that the second protectant transfer conduit 230 can puncture the seal on a container nozzle 225. In some embodiments, the container nozzles 225 may not be sealed, which means that the second protectant transfer conduit 230 in these embodiments does not have to include a tapered end (e.g., including a spike) and does not need to be vertically movable relative to the main body 125.

By providing the carousel 215, the second protectant containers 170 can be easily rotated from a storage position to become operable to supply second protectant. Therefore, the apparatus 100 may be able to continue to operate even after one of the second protectant containers 170 is depleted. The use of a hopper 165 can further facilitate continuous operation because the second protectant within the hopper 165 can be temporarily relied upon while the carousel 215 is rotating to replace a depleted second protectant container 170 with a full second protectant container 170.

The term "carousel" should not be understood as limited to a rotary carousel, such as that shown in FIGS. 7 and 8. The carousel 215 allows the apparatus 100 to utilize multiple containers of protectant in an orderly fashion. Therefore, in another embodiment, the carousel 215 could process containers using a stack or queue methodology. The protectant containers could be loaded into a magazine storage so that each container is processed when needed. This would eliminate the need for a rotational storage methodology of a carousel (firearm revolver), to a linear processing ability akin to a firearm magazine. In another embodiment the carousel 215 could rotate in a vertical plane such that the containers are stored and rotated vertically akin to a Ferris wheel.

In this manner, the apparatus 100 may be continuously operated until all of the second protectant containers 170 (e.g., six containers) and the hopper 165 are fully depleted. The amount of first protectant being applied may be considerably less than then amount of second protectant. For example, if the first protectant is a UV curable monomer and the second protectant is MMA, it may be desirable to use one gallon of first protectant per every 800-1,500 feet length of laid tubular body and to apply one gallon of second protectant per every 50-200 feet length of laid tubular body. The use of a smaller amount of UV curable coating and a relatively larger amount of an uncured polymer or monomer, such as MMA, has been found to result in a particularly sturdy and structurally sound protective encasement around the tubular body. Further, the tubular body deployment process is more efficient when a relatively smaller amount of UV curable material is used as the first protectant because the apparatus 100 may travel at a greater speed.

Figure 5:
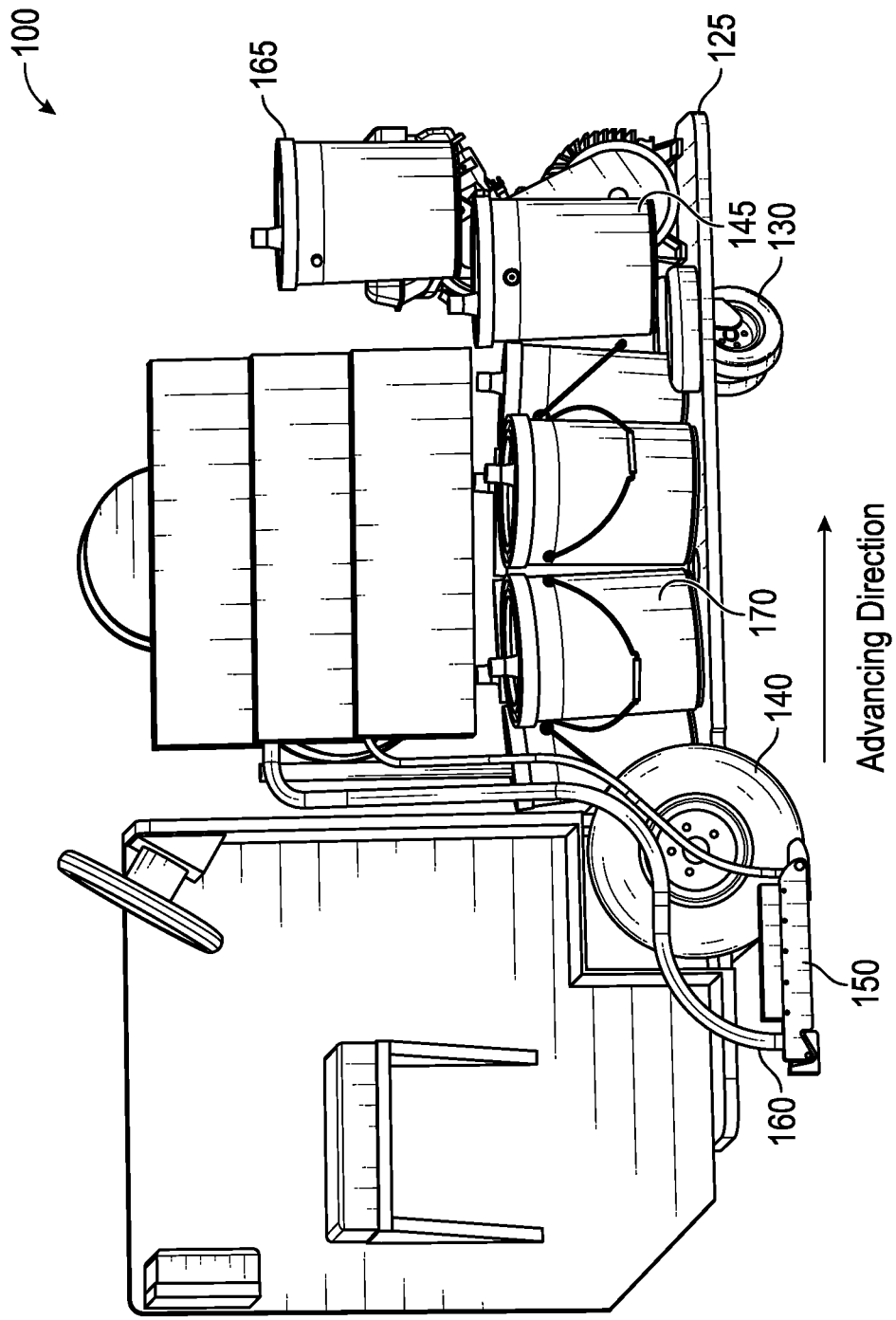
FIG. 5 is a side view showing the tubular body deployment apparatus of FIG. 1.

In some embodiments, the second protectant containers 170 may be held on the carousel 215 at an angle relative to the main body 125 (i.e., the bottom surface of each of the second plurality of containers 170 may be non-parallel to the main body 125 of the apparatus 100. For example, as shown in FIG. 5, each of the second plurality of containers may be tilted relative to the main body 125 such that the bottom surface of each of the containers 170 forms a small angle relative to the plane of the lower surface (i.e., floor surface) of the main body 125. For example, the second protectant containers 170 may be tilted at a 3°-15° angle relative to the floor surface of the main body 125. In a particularly preferred embodiment, the bottom plane of the second protectant containers 170 may form a 5° angle with the floor surface of the main body 125.

The benefit of forming this angle is that the second protectant containers 170 can have a lowest point directly in line with the second protectant transfer conduit 230 that may connect with the container nozzle 225 at an off-center location (as shown in FIG. 9). Therefore, the second protectant containers 170 may be more fully depleted during use by holding the containers 170 at a desired (predetermined) angle relative to the main body 125. In some embodiments, only the second protectant container 170 that is positioned at the second protectant transfer conduit 230 is angled relative to the main body 125, whereas the bottom surface of the other second protectant containers 170 is parallel or essentially parallel to the floor surface of the main body 125.

Figure 10:
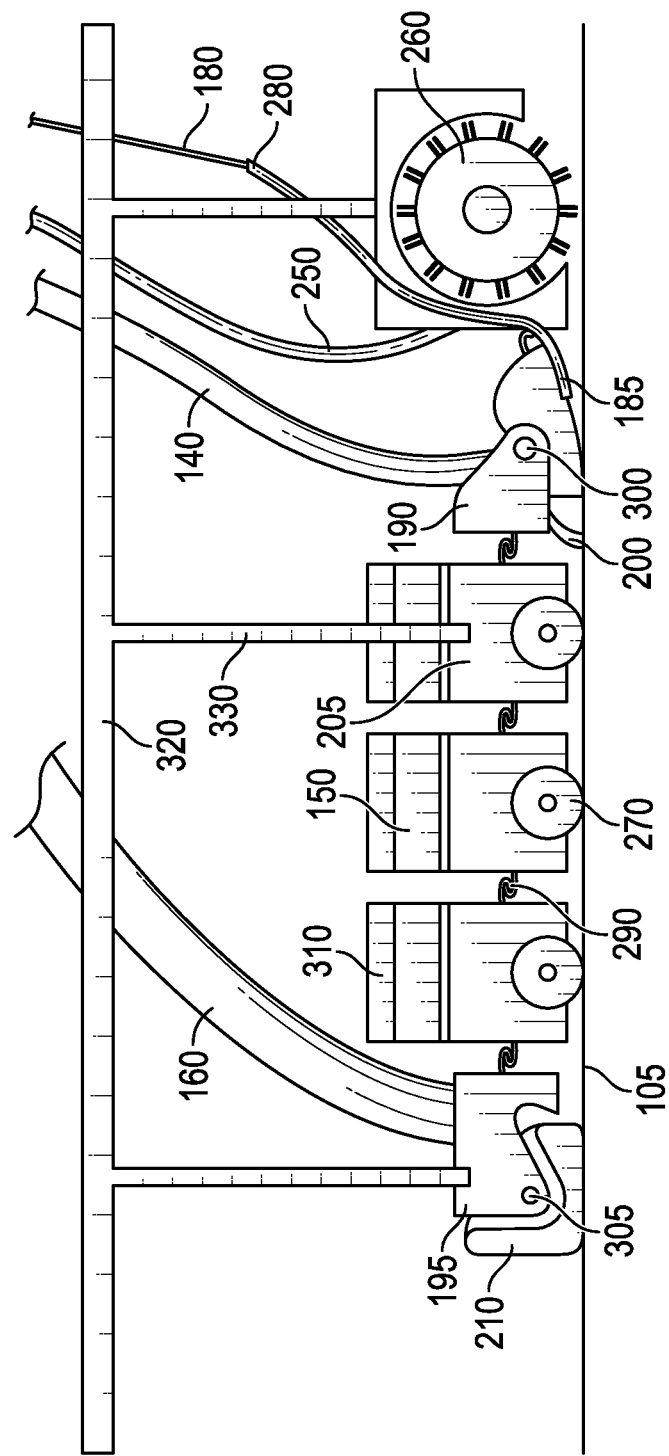
FIG. 10 is an enlarged side view showing the deployment train according to an embodiment of the present application.

FIG. 10 shows another embodiment of the deployment train (e.g., that may include the curing device 150 and the protectant and tubular body deployment mechanisms). As shown in FIG. 10, this deployment train includes the curing device 150, the deployment end 190 of the first protectant conduit 140, the deployment end 195 of the second protectant conduit 160, the deployment groove 185 for deploying the tubular body 180, and the second shaping template 210, as discussed above. The hinged connections 300, 305 towards the distal and proximal ends, respectively, are also shown in FIG. 10. The benefits of the hinged connections 300, 305 are described above, but in general, these connections help impart maneuverability and flexibility to overall deployment train to allow the deployment train to move over a variety of surface contours and up and down different elevations.

FIG. 10 also illustrates that the deployment train (i.e., the elongated deployment mechanism that may have a centipede structure) can include a cleaning and preparation stage that interacts with the surface 105 before the tubular body is placed on the surface 105. More specifically, the apparatus 100 may include an air blower conduit 250 that applies a positive air flow (or any gas) onto the surface 105 to attempt to blow possible debris from the location of the surface 105 that the tubular body 180 will be deployed on. The apparatus 100 may also include a wire brush 260 that contacts the surface 105 ahead of (distal to) the position that the tubular body 180 is deployed. U.S. Pat. No. 9,588,315 discusses additional aspects, details, and possible configurations of the cleaning and preparation stage, which are incorporated herein by reference. Any of these details or components may be utilized in the embodiments of the present application, as would be understood by one of ordinary skill in the art.

FIG. 10 also shows that the deployment train may include a tubular placement stage. The tubular placement stage is seen towards the middle of FIG. 10 in the advancing direction, and it can include the tubular body placement on the surface, the first protectant placement and shaping stage, the protectant curing stage, and the second protectant placing, shaping, and curing stages.

As better depicted in FIG. 10, the tubular body 180 may be fed to the deployment groove 185 via a tubular body guide 280. The tubular body guide 280 may be an elongated conduit (hollow cylindrical tube) that protects the tubular body 180 in the vicinity of the surface 105 and directs the tubular body 180 to the deployment groove 185. In some embodiments, the tubular body guide 280 may direct the tubular body 180 directly to the surface 105 and the deployment groove 185 may be omitted. In other embodiments, as shown in FIG. 10, the deployment guide 280 may extend under the distal structural member into the deployment groove 185 (see also FIG. 3).

FIG. 10 shows that the deployment train may include a curing device 150 that includes a plurality of spaced apart sections. Each of these sections may include side panels 205 and the heat sink 155, as discussed above. As shown in FIG. 10, in another embodiment, a heat sink fan 310 may provide active cooling, e.g., by providing a positive cooling flow to each section of the curing device 150. A heat sink 155 can also be included as described above, or the heat sink fan 310 may be provided without a heat sink 155.

FIG. 10 also shows that the different sections of the curing device 150 may be contact the surface 105 via train car wheels 270 and may be connected to one another with linkages 290. Therefore, the entire deployment operation may be planar along the surface (as no trench or groove is created). In other words, the tubular body 180 is applied directly on the surface with the first protectant, second protectant and train car wheels 270, all contacting the surface along the same plane (i.e., all having contact points directly on a planar surface, such as a paved surface, so that the various components are all deployed directly on the surface and not within a trench dug into the surface).

FIG. 10 also shows that some embodiments may allow for the entire deployment train (or at least the centipede structure of the deployment train) to be raised and/or lowered to the surface using structural elements that connect it to the main body 125 (e.g., the chassis) of the apparatus 100. As shown in FIG. 10, a lifting assembly 320 can include a vertical lifting arm 330 that connects to the deployment train. A lifting force may be applied to the lifting assembly 320 (e.g., manually or automatically using any type of actuating mechanical apparatus) to raise one or more of the lifting arms 330 vertically to lift the deployment train and remove some or all of the structural elements from the surface 105. The lifting assembly 320 provides additional maneuverability benefits depending on elevation or contour changes in the surface 105 that receives the tubular body 180.

Figure 11:
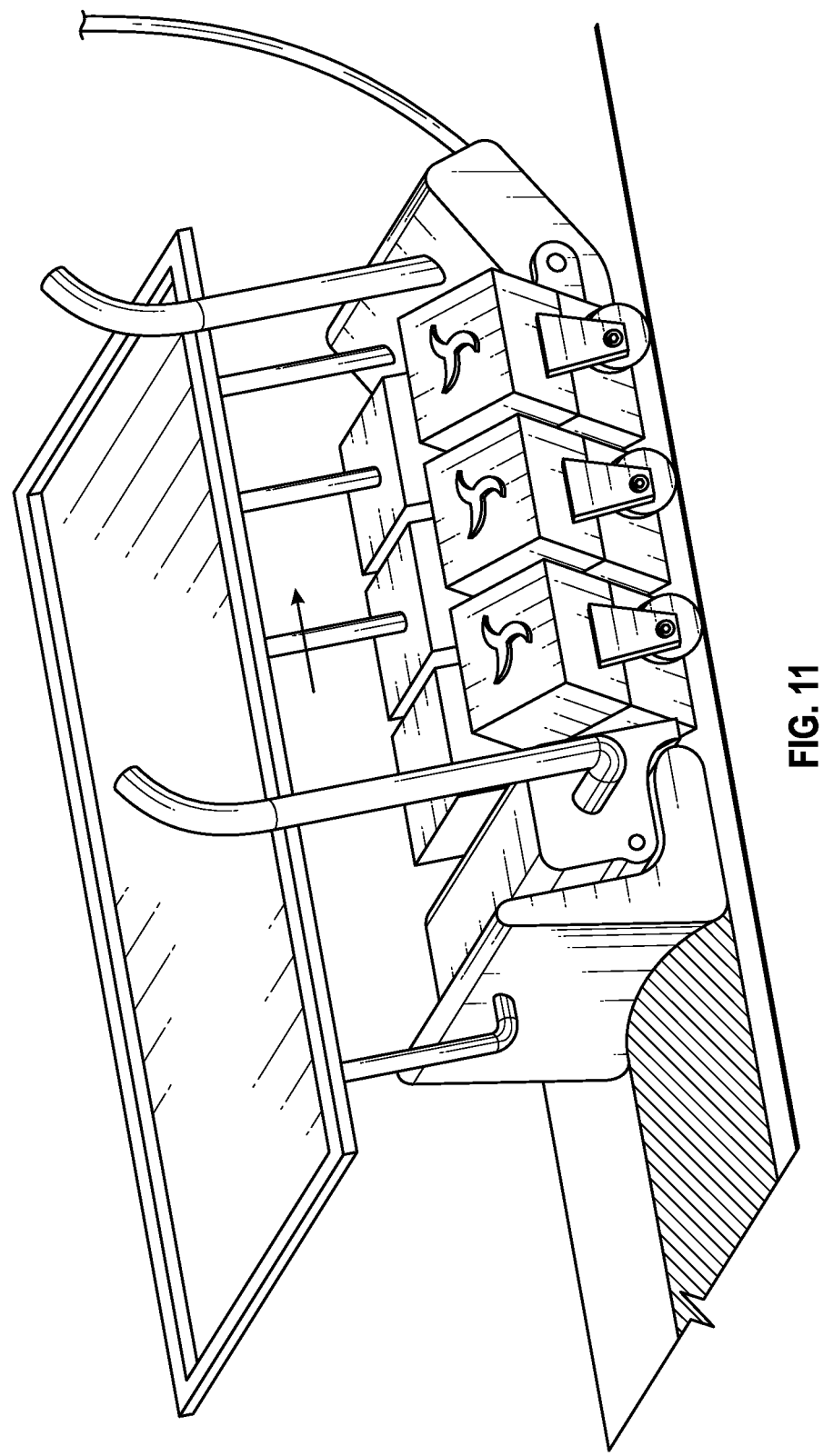
FIG. 11 is an enlarged perspective view showing the deployment train according to an embodiment of the present application.

FIG. 11 provides a perspective view of another embodiment of the deployment train. As can be seen in FIG. 11, the curing device 150 may include a plurality of curing emitters (e.g., lights) that are positioned at different angles relative to the surface 105.

The detailed description above describes a tubular body deployment method and an apparatus for deploying a tubular body. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. An apparatus for adhering a tubular body to a surface, the apparatus comprising:
   a main body movable in an advancing direction, the main body possessing a forward end and a rear end;
   a deployment mechanism configured to deploy a tubular body directly onto a surface;
   a first protectant container configured to store a first protectant, the first protectant container being connected to the main body, the first protectant being uncured when stored in the first protectant container;
   a first protectant conduit configured to apply the first protectant on the surface, the first protectant being applied on the surface proximal to where the tubular body is deployed onto the surface in the advancing direction so that the first protectant is deployed on top of the tubular body and the surface;
   at least one curing device positioned proximal to the first protectant conduit in the advancing direction, the at least one curing device being configured to cure the first protectant after the first protectant is applied on the tubular body on the surface to protectively adhere the tubular body to the surface;
   a second protectant container configured to store a second protectant, the second protectant being different than the first protectant, the second protectant container being connected to the main body; and a second protectant conduit configured to apply the second protectant onto the surface, the second protectant being applied proximal to the at least one curing device in the advancing direction so that the second uncured protectant is deployed on top of the first protectant and the tubular body on the surface.

2. The apparatus according to claim 1, wherein the at least one curing device is configured to fully cure the first protectant before the second protectant is applied on top of the first protectant and the tubular body.

3. The apparatus according to claim 1, wherein the first protectant is an uncured monomer.

4. The apparatus according to claim 1, wherein the at least one curing device comprises at least one ultraviolet light source.

5. The apparatus according to claim 1, wherein the second protectant is an uncured polymer.

6. The apparatus according to claim 1, wherein the second protectant is methyl methacrylate.

7. The apparatus according to claim 1, wherein the second protectant comprises a first component and a second component, the second component causing the first component to cure when the first and second components are mixed.

8. The apparatus according to claim 1, further comprising:
   a shaping template comprising an opening and being positioned to contact the surface when the main body moves in the advancing direction.

9. The apparatus according to claim 8, wherein
   the first protectant conduit possesses a deployment end and a container end, the first protectant moving out of the deployment end when the first protectant is applied to the surface and the container end of the first protectant conduit communicating with an interior of the first protectant container, and
   the shaping template being positioned directly behind the deployment end of the first protectant conduit so that the first protectant passes through the opening of the shaping template after the first protectant has been applied onto the surface.

10. The apparatus according to claim 8, wherein the shaping template is positioned under the at least one curing device, the shaping template being transparent such that light from the at last one curing device passes through the shaping template.

11. The apparatus according to claim 8, further comprising:
    a second shaping template comprising an opening and being positioned to contact the surface when the main body moves in the advancing direction.

12. The apparatus according to claim 11, wherein
    the first protectant conduit possesses a deployment end and a container end, the first protectant moving out of the deployment end when the first protectant is applied to the surface and the container end of the first protectant conduit communicating with an interior of the first protectant container,
    the shaping template being positioned directly behind the deployment end of the first protectant conduit so that the first protectant passes through the opening of the shaping template after the first protectant has been applied onto the surface,
    the second protectant conduit possesses a deployment end and a container end, the second protectant moving out of the deployment end when the second protectant is applied to the surface and the container end of the second protectant conduit communicating with an interior of the second protectant container, and
    the second shaping template being positioned directly behind the deployment end of the second protectant conduit such that the second protectant passes through the opening of the second shaping template after the second protectant has been applied onto the surface.

13. The apparatus according to claim 1, wherein the at least one curing device comprises a plurality of light emitters, the plurality of light emitters being connected in a sequential manner in the advancing direction.

14. The apparatus according to claim 13, wherein,
    a transverse direction is perpendicular to the advancing direction, and
    the plurality of light emitters are movably connected to one another such that adjacent light emitters may move relative to one another in the transverse direction.

15. The apparatus according to claim 1, further comprising a plurality of wheels connected to the main body, the plurality of wheels rotating when the main body moves in the advancing direction.

16. The apparatus according to claim 1, wherein the tubular body is a communication line.

17. The apparatus according to claim 1, wherein the tubular body is fiber optic cable.

18. An apparatus for adhering a tubular body to a surface, the apparatus comprising:
- a main body movable in an advancing direction, the main body possessing a forward end and a rear end;
- a deployment mechanism configured to deploy a tubular body directly onto a surface;
- a plurality of protectant containers configured to store a protectant, the protectant containers being connected to the main body, the protectant being uncured when stored in the protectant containers, the protectant being curable;
- a protectant conduit configured to apply the protectant on the surface, the protectant conduit being positioned to apply the protectant behind where the tubular body is deployed onto the surface in the advancing direction so that the protectant is deployed on top of the tubular body when the tubular body is on the surface; and
- a rotary carousel connected to the protectant containers, the rotary carousel being movable to collectively rotate the protectant containers relative to the main body.

19. The apparatus according to claim 18, wherein the protectant is an uncured monomer.

20. The apparatus according to claim 19, wherein the protectant is methyl methacrylate.

21. The apparatus according to claim 18, further comprising:
- a transfer conduit positioned to transfer the protectant from one of the plurality of protectant containers to the protectant conduit.

22. The apparatus according to claim 21, wherein the transfer conduit comprises a tapered end, the one of the plurality of protectant containers comprising a seal, and the transfer conduit being movable relative to the one of the plurality of protectant containers to puncture the seal with the tapered end so that the transfer conduit communicates directly with an interior of the one of the plurality of protectant containers.

23. The apparatus according to claim 21, wherein
when the rotary carousel collectively moves the protectant containers relative to the main body, the transfer conduit becomes positioned to transfer the protectant from a second of the plurality of protectant containers.

24. The apparatus according to claim 18, wherein the rotary carousel is connected to each of the plurality of protectant containers to position each of the plurality of protectant containers at an angle relative to the main body, wherein the angle relative to the main body is the same for each of the plurality of protectant containers.

25. The apparatus according to claim 18, further comprising:
- a hopper positioned between the transfer conduit and the protectant conduit such that the protectant flow path is from the one of the plurality of protectant containers to the transfer conduit to the protectant hopper to the protectant conduit to the surface.

26. The apparatus according to claim 25, wherein
the hopper is a container, and
each of the plurality of protectant containers is an identical type of container as the hopper.

27. The apparatus according to claim 18, wherein the protectant is a second protectant and the protectant conduit is a second protectant conduit, and the apparatus further comprises:
- a first protectant container configured to store a first protectant, the first protectant container being connected to the main body, the first protectant being uncured when stored in the first protectant container, the first protectant being different than the second protectant; and
- a first protectant conduit configured to apply the first protectant on the surface, the first protectant being applied on the surface behind where the tubular body is deployed onto the surface in the advancing direction so that the first protectant is deployed onto the tubular body and the surface.

28. A method comprising:
- applying a tubular body onto a surface;
- applying a first protectant onto the tubular body after the tubular body has been applied to the surface;
- shaping the first protectant after the first protectant has been applied to the tubular body on the surface;
- curing the first protectant after the first protectant has been applied to the tubular body on the surface;
- applying a second protectant on top of the first protectant and the tubular body after the first protectant has been applied to the surface, the second protectant being different than the first protectant; and
- curing the second protectant after the second protectant has been applied to the tubular body, such that the tubular body is protectively adhered to the surface by the first and second protectants.

29. The method according to claim 28, wherein the tubular body is fiber optic cable,
the first protectant is UV curable,
the curing of the first protectant utilizes at least one UV curing light, and
the curing of the second protectant is by an exothermic chemical reaction.

* * * * *